(12) United States Patent
Tang

(10) Patent No.: US 10,880,061 B2
(45) Date of Patent: Dec. 29, 2020

(54) METHOD, NETWORK DEVICE AND TERMINAL DEVICE FOR TRANSMITTING REFERENCE SIGNAL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/215,176

(22) Filed: Dec. 10, 2018

(65) Prior Publication Data

US 2019/0173639 A1 Jun. 6, 2019

Related U.S. Application Data

(63) Continuation of application No. PCT/CN2016/098048, filed on Sep. 5, 2016.

(51) Int. Cl.
*H04W 4/00* (2018.01)
*H04L 5/00* (2006.01)
(Continued)

(52) U.S. Cl.
CPC ........ *H04L 5/0048* (2013.01); *H04L 27/2605* (2013.01); *H04W 72/04* (2013.01);
(Continued)

(58) Field of Classification Search
CPC ............... H04W 72/04; H04W 72/044; H04W 72/0446; H04L 5/0048; H04L 72/2605; H04L 5/0094
See application file for complete search history.

(56) References Cited

U.S. PATENT DOCUMENTS

2010/0177746 A1* 7/2010 Gorokhov ............. H04L 5/0082
370/336
2012/0113951 A1 5/2012 Koo et al.
(Continued)

FOREIGN PATENT DOCUMENTS

| CN | 101827053 A | 9/2010 |
|---|---|---|
| CN | 103582141 A | 2/2014 |

OTHER PUBLICATIONS

International Search Report (ISR) and Written Opinion (WO) dated Jun. 7, 2017 for Application No. PCT/CN2016/098048.
(Continued)

*Primary Examiner* — Abdelnabi O Musa
(74) *Attorney, Agent, or Firm* — Ladas & Parry LLP

(57) ABSTRACT

Disclosed are a method, a network device, and a terminal device for transmitting a reference signal. The method includes: determining, by the network device of the first cell, a first resource element corresponding to the first cell, and at least one second resource element corresponding to at least one second cell; determining, by the network device, a resource element with the largest time domain resource and a resource element with the largest frequency domain resource among the first resource element and the at least one second resource element; determining, by the network device, a reference signal resource according to the resource element with the largest time domain resource and the resource element with the largest frequency domain resource; and transmitting, by the network device, a reference signal to a terminal device on the reference signal resource.

17 Claims, 8 Drawing Sheets

(51) Int. Cl.
*H04W 72/04* (2009.01)
*H04L 27/26* (2006.01)
*H04B 7/024* (2017.01)

(52) U.S. Cl.
CPC ..... *H04W 72/044* (2013.01); *H04W 72/0446* (2013.01); *H04B 7/024* (2013.01); *H04L 5/0094* (2013.01)

(56) References Cited

U.S. PATENT DOCUMENTS

| | | | | |
|---|---|---|---|---|
| 2012/0287875 | A1* | 11/2012 | Kim | H04B 7/024 370/329 |
| 2013/0128860 | A1* | 5/2013 | Zhang | H04L 5/0053 370/330 |
| 2016/0112173 | A1* | 4/2016 | Wang | H04B 7/0413 370/329 |
| 2018/0175992 | A1* | 6/2018 | Froberg Olsson | H04L 5/0057 |

OTHER PUBLICATIONS

Espacenet English abstract of CN 103582141 A.
Espacenet English abstract of CN 101827053 A.
Supplementary European Search Report (SESR) dated May 23, 2019 for Application No. EP 16914657.8.
Oppo: "Subcarrier spacing design for data and reference signal",3GPP Draft; R1-166609, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016), XP051140300, Retrieved from the Internet: URL:http://www.3gpp.org/ftp/Meetings_3GPP_SYNC/RAN1/Docs/.
Nokia et al: "On resource block grouping and multi-cell coordination aspects for mixed numerology support", 3GPP Draft; R1-167261, 3rd Generation Partnership Project (3GPP), Mobile Competence Centre ; 650, Route Des Lucioles ; F-06921 Sophia-Antipolis Cedex; France vol. RAN WG1, No. Gothenburg, Sweden; Aug. 22, 2016-Aug. 26, 2016, Aug. 21, 2016 (Aug. 21, 2016), XP051125797, Retrieved from the Internet: URL:http://www.3gpp.org/ftp/Meetings_3GPP_SYNC/RAN1/Docs/.
Nokia et al: "Resource block and guard band arrangement supporting mixed numerology", 3GPP Draft; R1-167200, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), XP051125796, Retrieved from the Internet: URL:http://www.3gpp.org/ftp/Meetings_ 3GPP_SYNC/RAN1/Docs/.
The First Office Action of corresponding Indian application No. 201817046772, dated Sep. 30, 2020.

* cited by examiner

METHOD, NETWORK DEVICE AND TERMINAL DEVICE FOR TRANSMITTING REFERENCE SIGNAL

CROSS-REFERENCE TO RELATED APPLICATIONS

This application is a continuation of International Application No. PCT/CN2016/098048, filed on Sep. 5, 2016, which is incorporated herein by reference in its entirety.

TECHNICAL FIELD

Embodiments of the present disclosure relate to the field of wireless communication and, more particularly, to a method, a network device, and a terminal device for transmitting a reference signal.

BACKGROUND

In a wireless communication system, a reference signal (RS) is a set of known signals transmitted from a transmitting device for use by a receiving device in channel estimation. For example, for a cell that supports coordinated multiple points (CoMP), a terminal device can measure the signal strength and interference intensity in individual cells using the reference signal, such as a channel state information RS (CSI-RS), and report the measurements to a base station.

In a long term evolution (LTE) system, the CSI-RS configured for terminal devices of different cells are aligned in their time-frequency resource locations, that is, CSI-RSs received at different terminal devices for channel measurements are of the same size in terms of the time-frequency resource occupied, so that a terminal device is not affected by data transmissions of neighboring cells during its channel detection. However, the next generation 5G system can support various numerologies. When terminal devices located in neighboring cells use different numerologies, the different numerologies may prevent the resource elements (REs) occupied by the CSI-RSs from being aligned in their time-frequency positions. Thus, the terminal device can be subject to interference from data transmissions in neighboring cells during the channel measurement if the CSI-RSs are still configured in accordance with LTE system.

SUMMARY

Embodiments of the present disclosure provide a method, a network device, and a terminal device for transmitting a reference signal, which solves the problem of how to transmit a reference signal based on different numerologies.

A first aspect provides a method for transmitting a reference signal, including: determining, by a network device of a first cell, a first resource element corresponding to the first cell, and at least one second resource element corresponding to at least one second cell, where the first resource element has a time-frequency resource size different from that of the at least one second resource element; determining, by the network device, a resource element with a largest time domain resource and a resource element with a largest frequency domain resource among the first resource element and the at least one second resource element; determining, by the network device, a reference signal resource according to the resource element with the largest time domain resource and the resource element with the largest frequency domain resource; and transmitting, by the network device, a reference signal to a terminal device on the reference signal resource.

Thus, reference signal resources for transmitting reference signals are determined according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

For instance, in a first numerology used by a first cell, the subcarrier spacing is 15 kHz, the symbol length is $\frac{1}{15}$ kHz (i.e. 66.67 us), and the CP length is 4.687 us; and in a second numerology used by a second cell, the subcarrier spacing is 30 kHz, the symbol length is $\frac{1}{30}$ kHz (i.e. 33.33 us), and the CP length is 2.344 us. Thus, for a first resource element (the shaded blocks in the left portion of FIG. 3), the frequency domain resource size is 15 kHz, and the time domain resource size is 71.36 us, while for a second resource element (the shaded blocks in the right portion of FIG. 3), the frequency domain resource size is 30 kHz, and the time domain resource size is 35.68 us.

In an embodiment, the determining, by the network device, a reference signal resource according to the resource element with a largest time domain resource and the resource element with a largest frequency domain resource includes: determining, by the network device, the time domain resource size of the resource element with the largest time domain resource to be the time domain resource size of the reference signal resource, and the frequency domain resource size of the resource element with the largest frequency domain resource to be the frequency domain resource size of the reference signal resource.

For instance, in a first numerology used by a first cell, the subcarrier spacing is 15 kHz, the symbol length is 66.67 us, and the CP length is 4.687 us; in a second numerology used by a second cell, the subcarrier spacing is 30 kHz, the symbol length is 33.33 us, and the CP length is 2.344 us; for a first resource element, the frequency domain resource size is 15 kHz, and the time domain resource size is 71.36 us, and for a second resource element, the frequency domain resource size is 30 kHz, and the time domain resource size is 35.68 us. Thus, for the reference signal resource, the frequency domain resource size is 30 kHz, and the time domain resource size is 71.36 us. Alternatively, for the reference signal, the frequency domain resource size may also be an even multiple of 30 kHz, e.g., 60 kHz, and/or the time domain resource size may also be an even multiple of 71.36 us, e.g., 140 us.

In an embodiment, the method further includes:
determining, by the network device, a resource parameter corresponding to the first resource element, the resource parameter including: a ratio of the time domain resource size of the reference signal resource to the time domain resource size of the first resource element, and a ratio of the frequency domain resource size of the reference signal resource to the frequency domain resource size of the first resource element; and transmitting, by the network device, the resource parameter to the terminal device.

In an embodiment, the method further includes: transmitting, by the network device, information about the time-frequency resource of the first resource element, and/or information about the time-frequency resource of the at least one second resource element, to the terminal device.

In an embodiment, the method further includes: determining, by the network device, configuration information including a distribution period of the reference signal resource in time domain and a distribution period of the reference signal resource in frequency domain; and transmitting, by the network device, the configuration information to the terminal device.

In an embodiment, the reference signal includes at least one of the following: a cell-specific reference signal (CRS), a channel state information reference signal (CSI-RS), and a demodulation reference signal (DMRS).

The reference signal in an embodiment of the present disclosure may be used for the transmission of a downlink reference signal, such as a channel state information reference signal (CSI-RS), a cell-specific reference signal (CRS), and a demodulation reference signal (DMRS), and may also be used for an uplink reference signal, such as a sounding reference signal (SRS), an uplink DMRS, and the like.

In an embodiment, the reference signal includes a zero-power reference signal or a non-zero-power reference signal.

When the reference signal transmitted from a network device in a neighboring cell of the first cell to a terminal device 20 is a non-zero-power reference signal, the terminal device 20 may measure the channel state under the interference of that cell. When the reference signal transmitted from a network device in that cell to a terminal device 20 is a zero-power reference signal, the terminal device 20 may measure the channel state without the interference from that cell.

Moreover, the interference among the multiple cells in an embodiment of the present disclosure further includes interference among different numerologies. In accordance with the method for transmitting a reference signal described in an embodiment of the present disclosure, assistance may also be lent to the receiving end in estimating interferences among different numerologies.

In an embodiment, the method is applied to coordinated multiple points (CoMP), and the second cell is neighboring to the first cell.

A second aspect provides a method for transmitting a reference signal, the method including: determining, by a terminal device, a first resource element corresponding to a first cell; determining, by the terminal device, a reference signal resource according to the first resource element, where a time domain resource size of the reference signal resource is equal to the time domain resource size of a largest time domain resource among the first resource element and at least one second resource element, or equal to an even multiple of the time domain resource size of the resource element with the largest time domain resource; a frequency domain resource size of the reference signal resource is equal to the frequency domain resource size of a largest frequency domain resource among the first resource element and at least one second resource element, or equal to an even multiple of the frequency domain resource size of the resource element with the largest frequency domain resource, where the at least one second resource element is a resource element corresponding to at least one second cell; and receiving, by the terminal device, a reference signal transmitted on the reference signal resource from a network device in the first cell.

Thus, reference signal resources for transmitting reference signals are determined according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

For instance, in a first numerology used by a first cell, the subcarrier spacing is 15 kHz, the symbol length is $\frac{1}{15}$ kHz (i.e. 66.67 us), and the CP length is 4.687 us; and in a second numerology used by a second cell, the subcarrier spacing is 30 kHz, the symbol length is $\frac{1}{30}$ kHz (i.e. 33.33 us), and the CP length is 2.344 us. Thus, for a first resource element (the shaded blocks in the left portion of FIG. 3), the frequency domain resource size is 15 kHz, and the time domain resource size is 71.36 us, while for a second resource element (the shaded blocks in the right portion of FIG. 3), the frequency domain resource size is 30 kHz, and the time domain resource size is 35.68 us.

In an embodiment, before the determining, by the terminal device, a reference signal resource according to the first resource element, the method further includes:

receiving, by the terminal device, a resource parameter corresponding to the first resource element from the network device, the resource parameter including: a first ratio of the time domain resource size of the reference signal resource to the time domain resource size of the first resource element, and a second ratio of the frequency domain resource size of the reference signal resource to the frequency domain resource size of the first resource element; and the determining, by the terminal device, a reference signal resource according to the first resource element includes: determining, by the terminal device, a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

For instance, for a first resource element, the frequency domain resource size is 15 kHz, the time domain resource size is $\frac{1}{15}$ kHz (i.e. 66.67 us), and the CP length is 4.687 us; for a second resource element, the frequency domain resource size is 30 kHz, the time domain resource size is $\frac{1}{30}$ kHz (i.e. 33.33 us), and the CP length is 2.344 us. Assuming that the first ratio is M, the second ratio is N, and the network device 10 determines for the reference signal resource a frequency domain resource size of 30 kHz and a time domain resource size of 71.36 us, then the resource parameter corresponding to the first resource element includes M=30 kHz/15 kHz=2 and N=71.36 us/71.36 us=1. Thus, M=2 and N=1 are included in the resource parameter corresponding to the first resource element and transmitted from the network device 10 to the terminal device 20. After receiving the resource parameter transmitted from the network device 10, the terminal device 20 determines for the reference signal resource a frequency domain resource size of 15 kHz×2=30 kHz and a time domain resource size of 71.36 us×1=71.36 us according to the first resource element with the frequency domain resource size of 15 kHz, time domain resource size of 71.36 us, M=2 and N=1. It should be understood that the resource parameter corresponding to the first resource element and transmitted from the network device 10 to the terminal device 20 may also be M=4×n, N=2×m, etc., where both n and m are even numbers.

It should be understood that, in an embodiment, the resource parameter may further include: a difference between the time domain resource size of the reference signal resource and that of the first resource element, and a difference between the frequency domain resource size of the reference signal resource and that of the first resource element.

Alternatively, the resource parameter may further include: other parameter capable of clearly indicating a relation between the time domain resource size of the reference signal resource and that of the first resource element, and a parameter capable of clearly indicating a relation between the frequency domain resource size of the reference signal resource and that of the first resource element.

In an embodiment, before the determining, by a terminal device, a first resource element corresponding to a first cell, the method further includes: receiving, by the terminal device, information about the time-frequency resource of the at least one second resource element from the network device, where the determining, by the terminal device, a reference signal resource according to the first resource element includes: determining, by the terminal device, a time domain resource size of the resource element with the largest time domain resource, and the frequency domain resource size of the resource element with the largest frequency domain resource among the first resource element and the at least one second resource element; and determining, by the terminal device, the time domain resource size of the resource element with the largest time domain resource to be the time domain resource size of the reference signal resource, and the frequency domain resource size of the resource element with the largest frequency domain resource to be the frequency domain resource size of the reference signal resource.

For example, when n cells are neighboring to each other, and are corresponding to n numerologies among which at least two are different, and the corresponding subcarrier spacing and the sum of a symbol length and a cyclic prefix length are (F1, T1), (F2, T2), . . . , (Fn, Tn), respectively. Thus, for the Mode 2 in 450, the frequency domain resource size and the time domain resource size of the reference signal resource as determined by the terminal device 20 fulfill the following equations: F(CSI-RS)=Max(F1 . . . Fn); T(CSI-RS)=Max(T1 . . . Tn), where F(CSI-RS) is the frequency domain width of the reference signal resource, and T(CSI-RS) is the time domain width of the reference signal resource. Max(x) represents the maximum of the listed parameters. With the above equations, the network device 10 only needs to broadcast a list of time-frequency resource information about different resource elements that need to be measured by the terminal device 20 at the cell edge, and the terminal device 20 can derive the time-frequency resource of the reference signal resource based on the above equations.

In an embodiment, the method further includes: receiving, by the terminal device and from the network device, configuration information including a distribution period of the reference signal resource in time domain and a distribution period of the reference signal resource in frequency domain; and receiving, by the terminal device, a reference signal transmitted on the reference signal resource from a network device, including: receiving, by the terminal device, the reference signal transmitted from the network device on a plurality of the reference signal resources distributed periodically.

In an embodiment, the reference signal includes at least one of the following: a cell-specific reference signal (CRS), a channel state information reference signal (CSI-RS), and a demodulation reference signal (DMRS).

In an embodiment, the reference signal includes a zero-power reference signal or a non-zero-power reference signal.

In an embodiment, the method is applied to coordinated multiple points (CoMP), and the second cell is neighboring to the first cell.

A third aspect provides a network device which can be used to perform the various processes to be performed by the network device in the above methods for transmitting a reference signal according to the aforementioned first aspect and various implementations of the first aspect. The network device includes a determining module and a transmitting module, where the determining module is configured to: determine a first resource element corresponding to the first cell, and at least one second resource element corresponding to at least one second cell, where the first resource element has a time-frequency resource size different from that of the at least one second resource element; determine a resource element with a largest time domain resource and a resource element with a largest frequency domain resource among the first resource element and the at least one second resource element; determine a reference signal resource according to the resource element with the largest time domain resource and the resource element with the largest frequency domain resource; and the transmitting module is configured to transmit a reference signal to a terminal device on the reference signal resource.

A fourth aspect provides a network device which can be used to perform the various processes to be performed by the network device in the above methods for transmitting a reference signal according to the aforementioned first aspect and various implementations of the first aspect. The network device includes: a processor, configured to determine a first resource element corresponding to the first cell, and at least one second resource element corresponding to at least one second cell, where the first resource element has a time-frequency resource size different from that of the at least one second resource element; determine a resource element with a largest time domain resource and a resource element with a largest frequency domain resource among the first resource element and the at least one second resource element; determine a reference signal resource according to the resource element with the largest time domain resource and the resource element with the largest frequency domain resource; and a transceiver, configured to transmit a reference signal to a terminal device on the reference signal resource.

A fifth aspect provides a terminal device which can be used to perform the various processes to be performed by the terminal device in the above methods for transmitting a reference signal according to the aforementioned second aspect and various implementations of the second aspect. The terminal device includes a determining module and a receiving module, where the determining module is configured to: determine a first resource element corresponding to a first cell; determine a reference signal resource according to the first resource element, where a time domain resource size of the reference signal resource is equal to the time domain resource size of a largest time domain resource among the first resource element and at least one second resource element, or equal to an even multiple of the time domain resource size of the resource element with the largest time domain resource; a frequency domain resource size of the reference signal resource is equal to the frequency domain resource size of a largest frequency domain resource among the first resource element and at least one second resource element, or equal to an even multiple of the frequency domain resource size of the resource element with the largest frequency domain resource, where the at least one second resource element is a resource element corresponding to at least one second cell; and the receiving module is configured to receive a reference signal transmitted on the reference signal resource from a network device in the first cell.

A sixth aspect provides a terminal device which can be used to perform the various processes to be performed by the terminal device in the above methods for transmitting a reference signal according to the aforementioned second aspect and various implementations of the second aspect. The terminal device includes: a processor, configured to determine a first resource element corresponding to a first cell; determine a reference signal resource according to the first resource element, where a time domain resource size of the reference signal resource is equal to the time domain resource size of a largest time domain resource among the first resource element and at least one second resource element, or equal to an even multiple of the time domain resource size of the resource element with the largest time domain resource; a frequency domain resource size of the reference signal resource is equal to the frequency domain resource size of a largest frequency domain resource among the first resource element and at least one second resource element, or equal to an even multiple of the frequency domain resource size of the resource element with the largest frequency domain resource, where the at least one second resource element is a resource element corresponding to at least one second cell; and a transceiver, configured to receive a reference signal transmitted on the reference signal resource from a network device in the first cell.

A seventh aspect provides a computer readable storage medium storing a program which causes a network device to execute above methods for transmitting a reference signal according to aforementioned first aspect and/or any of the various implementations of the first aspect.

An eighth aspect provides a computer readable storage medium storing a program which causes a terminal device to execute above methods for transmitting a reference signal according to aforementioned second aspect and any of the various implementations of the second aspect.

In accordance to the method based on the embodiment of the present disclosure, reference signal resources for transmitting reference signals are determined according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

BRIEF DESCRIPTION OF THE DRAWINGS

A brief introduction will be given hereinafter to the accompany drawings which will be used in the description of the embodiments of the present disclosure in order to explain the technical solutions of the embodiments of the present disclosure more clearly. Apparently, the drawings in the description below are merely illustrating some embodiments of the present disclosure. Those skilled in the art may obtain other drawings according to these drawings without paying any creative labor.

DETAILED DESCRIPTION

Now the technical solutions in the embodiments of the present disclosure will be described hereunder clearly and comprehensively with reference to accompanying drawings. Obviously, the described embodiments are some, rather than all, embodiments of the present disclosure. Based on the described embodiment of the disclosure, other embodiments obtained by those of ordinary skill in the art without any creative work shall belong to the scope of the disclosure.

It should be understood that the technical solution of the embodiment of the present disclosure can be applied to various communication systems, such as Global System of Mobile communication (GSM) system, Code Division Multiple Access (CDMA) System, Wideband Code Division Multiple Access (WCDMA) system, General Packet Radio Service (GARS), Long Term Evolution (LTE) System, Universal Mobile Telecommunication System (UMTS) or other existing communication systems, and particularly, future 5G systems.

As used in the embodiment of the present disclosure, the terminal device may also be referred to as a User Equipment (UE), an access terminal, a subscriber unit, a subscriber station, a mobile station, a mobile STA, a far transmitted station, a remote terminal, a mobile device, and a user terminal, a terminal, a wireless communication device, a user agent or a subscriber installation. The access terminal may be a cellular phone, a cordless phone, a session initiation protocol (SIP) phone, a wireless local loop (WLL) station, or a personal digital assistant (PDA), or a device with wireless communication capabilities, such as a handheld device, computing device or other processing device connected to a wireless modem, a vehicle-mounted device, a wearable device, a terminal device in a future 5G network, or terminal devices in a future evolved public land mobile communication network (PLMN).

As used in the embodiment of the present disclosure, the network device may be a device in communicating with a terminal device, and could be a base transceiver station (BTS) as described in GSM or CDMA, or a base station (NodeB, or NB) in WCDMA system, or an evolved base station (evolutional NodeB, or eNB or eNodeB) in LTE system, or a radio controller in cloud radio access network (CRAN) scenario. Alternatively, the network device may be a relay station, an access point, a vehicle-mounted device, a wearable device, and a network device in a future 5G network or a network device in a future evolved PLMN network, or the like.

Figure 1:
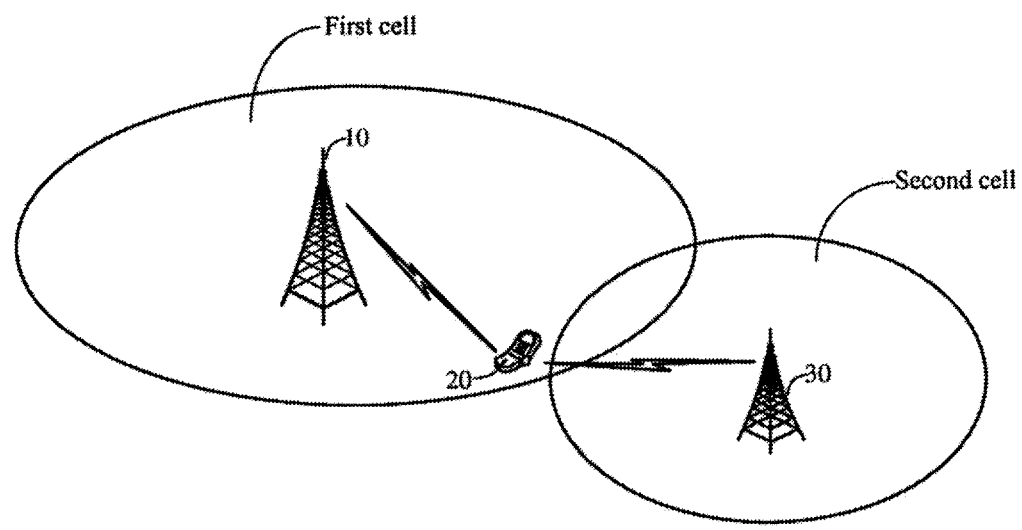
FIG. 1 is a schematic diagram illustrating an application scenario for an embodiment of the present disclosure.

FIG. 1 is a schematic diagram illustrating an application scenario for an embodiment of the present disclosure. The scenario shown in FIG. 1 may be a coordinated multiple points (CoMP) system. As shown in FIG. 1, the scenario includes a network device 10, a terminal device 20 located at the edge of the cell covered by the network device 10, a network device 30, and a terminal device (not shown) located within the coverage of the network device 30. The cell covered by the network device 10 is the first cell, the cell covered by the network device 30 is the second cell, and the numerologies used by the terminal device 20 at the edge of the first cell and the terminal device (not shown) in the second cell when transmitting data can be different. The following descriptions will be using the network device 10 and the terminal device 20 as an illustration. The terminal device 20 can receive the reference signals transmitted from both the network device 10 and the network device 30 at the same time, and may perform channel detection according to the received reference signals. For instance, the terminal device 20 may detect a channel state under interference from the second cell, or detect a channel state without interference from the second cell.

It should be noted that the example in FIG. 1 is only intended to help those skilled in the art to better understand the embodiments of the present disclosure, rather than to limit the scope of the embodiments of the present disclosure. For example, although only two network devices and one terminal device are depicted in FIG. 1, the number of network devices and terminal devices in an embodiment of the present disclosure is not limited thereto. Instead, more terminal devices can be within the cell covered by individual network devices, and more network devices can provide data services to the same terminal device. For another example, the method described in an embodiment of the present disclosure may be used not only in CoMP communication, but also other communication systems, which will not be limited herein. The following will be described using CoMP communication as an illustration only, and in conjunction with FIG. 1.

In an LTE system, there are three downlink reference signals, namely, cell specific RS (CRS), channel state information RS (CSI-RS), and demodulation RS (DMRS). The CRS and the CSI-RS are common reference signals broadcasted in the cell, serving the primary purpose of providing the terminal device with information for estimating channel state (CSI). In an LTE system, a terminal device may measure the channel state based on CRS or CSI-RS, and report the channel state to a network device, periodically or aperiodically.

Figure 2A:
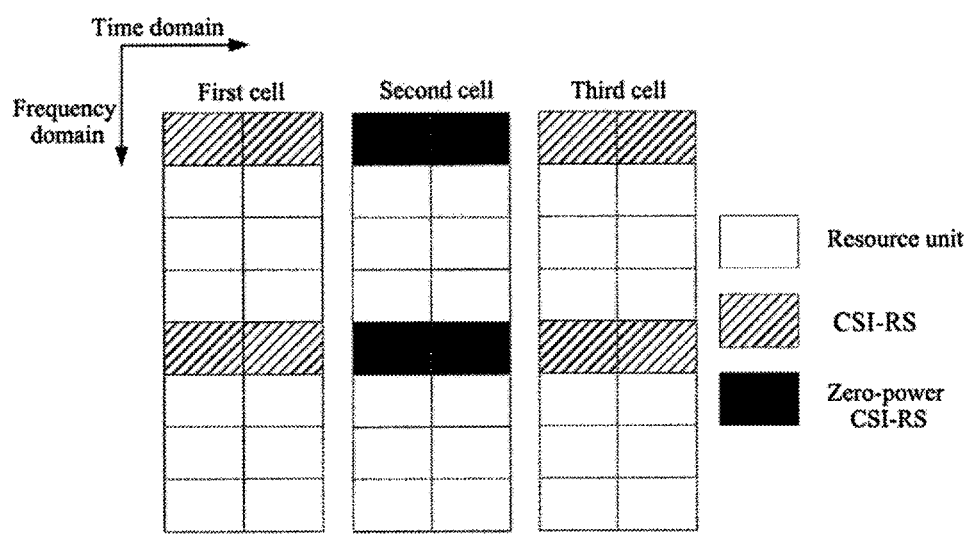
FIG. 2(a) is a schematic diagram illustrating a channel state measurement based on CSI-RS in prior art when there is inter-cell interference.
Figure 2B:
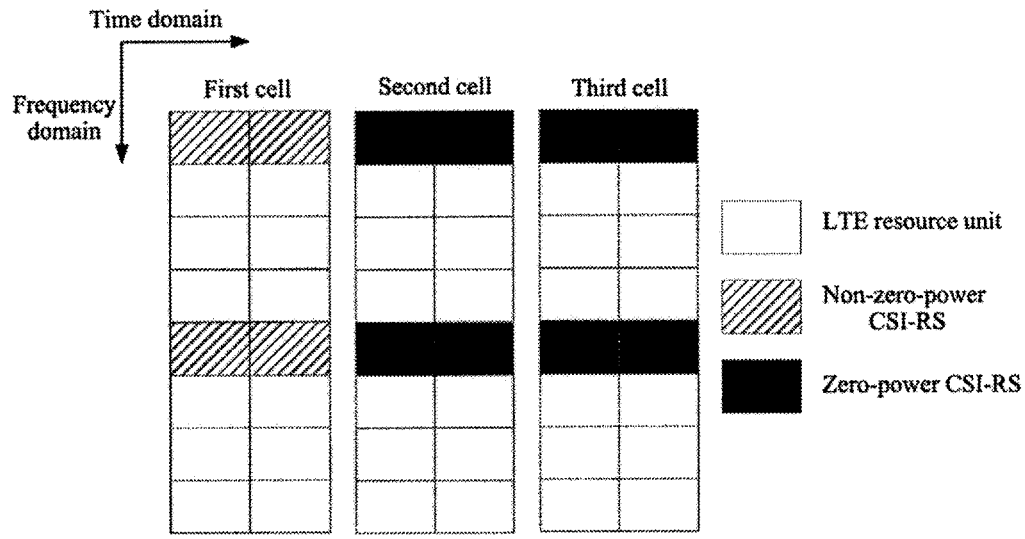
FIG. 2(b) is a schematic diagram illustrating a channel state measurement based on CSI-RS in prior art when there is inter-cell interference.

Taking CSI-RS as an example, in a cell supporting, e.g., CoMP, a terminal device will measure the signal strength and interference intensity of each cell using CSI-RS, and report the same to a network device. When the terminal device is located at the edge of the cell, the network device configures the terminal device with a non-zero-power CSI-RS and a zero-power CSI-RS to enable the terminal device to accurately measure signal interference from different cells. FIGS. 2(a) and 2(b) are schematic diagrams illustrating channel detection based on CSI-RS in the presence of cell interference. When CSI-RS is configured according to FIG. 2(a), the terminal device in the first cell can measure the channel state of the first cell with interference from the third cell, the terminal device in the second cell can measure the channel state at zero-power CSI-RS with interference from the first cell and the third cell, and the terminal device in the third cell can measure the channel state with interference from the first cell. When CSI-RS is configured according to FIG. 2(b), the terminal device in the first cell can measure the channel state of the first cell without interference from any neighboring cell, the terminal in the second and third cell can measure the channel state at zero-power CSI-RS with interference from the first cell.

Figure 3:
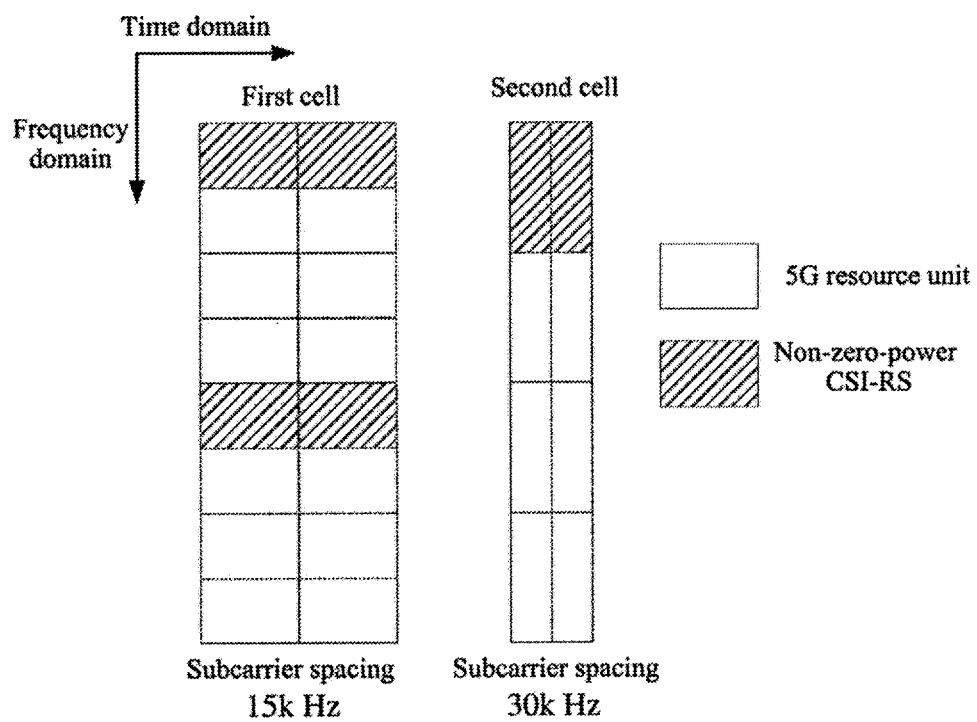
FIG. 3 is a schematic diagram illustrating the effect on the transmission of reference signals when there are different numerologies.

In the LTE system, the CSI-RS configured for terminal devices of different cells are aligned in their time-frequency resource locations, hence the terminal device is not affected by the data transmission in the neighboring cells when detecting the channel state. However, the next generation 5G system can support various numerologies. When terminal devices located in neighboring cells use different numerologies, the different numerologies may prevent the resource elements (RE) occupied by the CSI-RSs from being aligned in their time-frequency positions. For example, as shown in FIG. 3, which illustrates the effect on the transmission of reference signals when there are different numerologies, it can be seen that, for instance, the subcarrier spacing is 15 kHz in the numerology used by the terminal device in the first cell, and 30 kHz in the numerology used by the terminal device in the second cell. Thus, the terminal device can be subject to interference from data transmissions in neighboring cells during the channel state measurement of cell if the CSI-RSs are still configured in accordance with LTE system.

In an embodiment of the present disclosure, the network device configures a time-frequency resource for transmitting the reference signal according to the numerology used by the terminal device, so that the terminal device is not affected by the data transmission based on other numerologies when receiving the reference signal.

It should be understood that the neighboring cells as used in an embodiment of the present disclosure may mean different cells with some overlap between their coverages, or different cells that, although separated by certain distance, can still interfere with signal transmission in each other, which will not be limited herein. Moreover, the method in an embodiment of the present disclosure can be used in any communication scenario, and the cell participating in the reference signal transmission can be any cell. In particular, when applied to CoMP transmission, different cells participating in the reference signal transmission may be considered as neighboring cells.

Figure 4:
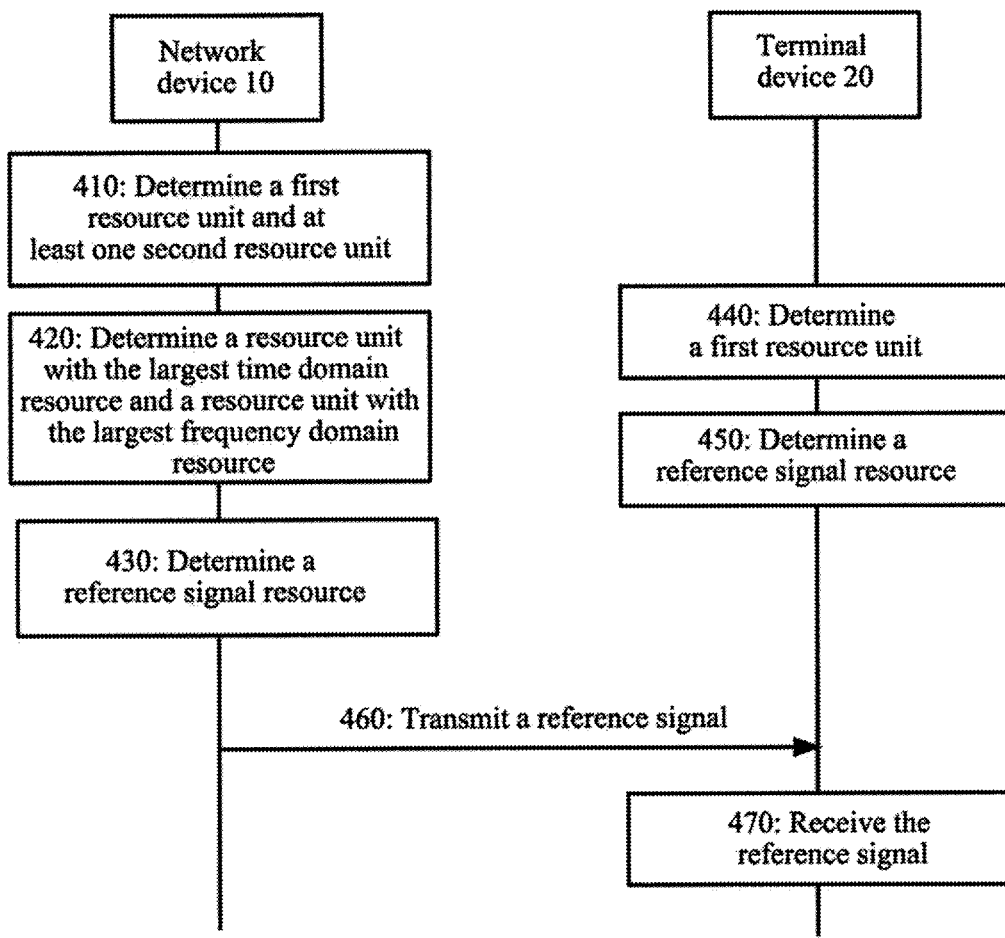
FIG. 4 is an interaction flow chart illustrating a method for transmitting a reference signal according to an embodiment of the present disclosure.

FIG. 4 is an interaction flow chart illustrating a method for transmitting a reference signal according to an embodiment of the present disclosure. FIG. 4 shows an network device 10 and a terminal device 20 of a first cell. As shown in FIG. 4, the specific process of transmitting the reference signal includes:

410: the network device 10 of the first cell determines a first resource element corresponding to the first cell, and at least one second resource element corresponding to at least one second cell.

The second cell is neighboring to the first cell, and the first resource element has a time-frequency resource size different from that of the at least one second resource element.

Specifically, in a 5G system, resource element (RE) can be different for different cells. Of all the cells neighboring to the first cell, at least some cells can have resource elements different from that of the first cell, and the at least one second cell can be such a cell. In an embodiment of the present disclosure, only the first cell and the at least one second cell are used as an example. For the case where the resource element of the first cell and its neighboring cells are the same, the specific implementation may be in accordance with a method according to an embodiment of the present disclosure or a method found in prior art, which will not be limited herein.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

For example, as shown in FIG. 1, where only a first cell and any one of the at least one second cell are depicted, the terminal device 20 may be a terminal device located at the edge of the first cell, and the second cell is neighboring to the first cell, the terminal device 20 can receive the reference signals transmitted from the network device 10 of the first cell and the network device 30 of the second cell at the same time, and perform channel detection according to the received reference signal. The numerology configured in the first cell for transmitting data is the first numerology, and the numerology configured in the first cell for transmitting data is the second numerology different from the first numerology. Further, the first numerology and the second numerology individually include a subcarrier spacing, or a symbol length and a cyclic prefix length, and differ in at least one of the three parameters.

Specifically, during a data interaction with the network device 10, the terminal device located in the first cell may use the first numerology to transmit data according to the parameters in the first numerology, such as subcarrier spacing, or symbol length and cyclic prefix (CP) length. Instead, the numerology used by the terminal device (not shown) located at the second cell for data transmission with the network device 30 may be the second numerology. The second numerology may be different from the first numerology. For example, the sum of a symbol length and a cyclic prefix length may be different, and/or the subcarrier spacing may be different. Thus, the first resource element of the first cell using the first numerology and the second resource element of the second cell using the second numerology may be different resource elements, and the time-frequency resource size is not equal for the first resource element and the second resource element. For example, as shown in FIG. 3, in a first numerology, the subcarrier spacing is 15 kHz, the symbol length is $\frac{1}{15}$ kHz (i.e. 66.67 us), and the CP length is 4.687 us; and in a second numerology, the subcarrier spacing is 30 kHz, the symbol length is $\frac{1}{30}$ kHz (i.e. 33.33 us), and the CP length is 2.344 us. Thus, for the first resource element (the shaded blocks in the left portion of FIG. 3) of the first cell using the first numerology, the frequency domain resource size is 15 kHz, and the time domain resource size is 71.36 us, while for the second resource element (the shaded blocks in the right portion of FIG. 3) of the second cell using the second numerology, the frequency domain resource size is 30 kHz, and the time domain resource size is 35.68 us.

420: the network device 10 determines a resource element with the largest time domain resource and a resource element with the largest frequency domain resource among the first resource element and the at least one second resource element.

Specifically, the network device 10 may determine the resource element with the largest time domain resource and the resource element with the largest frequency domain resource from among the first resource element and the at least one second resource element, so as to enable determination of the reference signal resource according to the resource element with the largest time domain resource and the resource element with the largest frequency domain resource.

430: the network device 10 determines a reference signal resource according to the resource element with the largest time domain resource and the resource element with the largest frequency domain resource.

Specifically, the network device 10 identifies the resource element with the largest time domain resource and the resource element with the largest frequency domain resource from among the first resource element and the at least one second resource element, and determines the reference signal resource to be used for transmitting the reference signal according to the resource element with the largest time domain resource and the resource element with the largest frequency domain resource.

The time domain resource size of the reference signal resource may be equal to the time domain resource size of the largest time domain resource among the first resource element and at least one second resource element, or equal to an even multiple of the time domain resource size of the resource element with the largest time domain resource. The frequency domain resource size of the reference signal resource may be equal to the frequency domain resource size of the largest frequency domain resource among the first resource element and at least one second resource element, or equal to an even multiple of the frequency domain resource size of the resource element with the largest frequency domain resource, where the at least one second resource element is a resource element corresponding to at least one second cell.

In an embodiment, the determining, by the network device, a reference signal resource according to the resource element with the largest time domain resource and the resource element with the largest frequency domain resource includes:

determining, by the network device, the time domain resource size of the resource element with the largest time domain resource to be the time domain resource size of the reference signal resource, and the frequency domain resource size of the resource element with the largest frequency domain resource to be the frequency domain resource size of the reference signal resource.

Specifically, if among the first resource element and the at least one second resource element, the first resource element has the larger time domain resource, then the time domain resource size of the reference signal resource is equal to that of the first resource element, or an even multiple of the time domain resource size of the first resource element. If among the first resource element and the at least one second resource element, at least one of the at least one second resource element has the largest time domain resource, then the time domain resource size of the reference signal resource is equal to that of the second resource element with the largest time domain resource, or an even multiple of the time domain resource size of the second resource element with the largest time domain resource. Similarly, if among the first resource element and the at least one second resource element, the first resource element has the larger frequency domain resource, then the frequency domain resource size of the reference signal resource is equal to that of the first resource element, or an even multiple of the frequency domain resource size of the first resource element. If among the first resource element and the at least one second resource element, at least one of the at least one second resource element has the largest frequency domain resource, then the frequency domain resource size of the reference signal resource is equal to that of the second resource element with the largest frequency domain resource, or an even multiple of the frequency domain resource size of the second resource element with the largest frequency domain resource.

Figure 5:
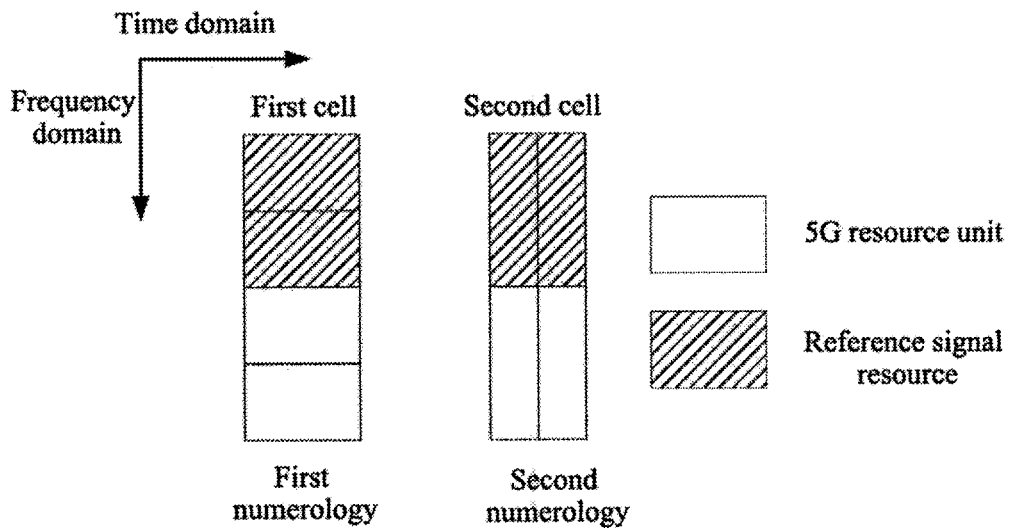
FIG. 5 is a schematic diagram illustrating a reference signal resource based on different numerologies according to an embodiment of the present disclosure.

For example, FIG. 5 is a schematic diagram illustrating a reference signal resource based on different numerologies according to an embodiment of the present disclosure. FIG. 5 illustrates the reference signal resources of only a first cell and any one of the at least second cell. The first cell uses a first numerology for data transmission, and the second cell uses a second numerology for data transmission. In the first numerology, the subcarrier spacing is 15 kHz, the symbol length is 66.67 us, and the CP length is 4.687 us, while in the second numerology, the subcarrier spacing is 30 kHz, the symbol length is 33.33 us, and the CP length is 2.344 us. The network device 10 determines for the first resource element according to the first numerology a frequency domain resource size of 15 kHz and a time domain resource size of 71.36 us, while determines for the second resource element according to the second numerology a frequency domain resource size of 30 kHz and a time domain resource size of 35.68 us. It can be seen that the frequency domain resource size of the second resource element is greater than that of the first resource element, and hence the frequency domain resource size of the reference signal resource is equal to that of the second resource element. Yet, the time domain resource size of the first resource element is greater than that of the second resource element, and hence the time domain resource size of the reference signal resource is equal to that of the first resource element. Thus, as shown in FIG. 5, for the reference signal resource, the frequency domain resource size is 30 kHz, and the time domain resource size is 71.36 us. Alternatively, for the reference signal, the frequency domain resource size may also be an even multiple of 30 kHz, e.g., 60 kHz, and/or the time domain resource size may also be an even multiple of 71.36 us, e.g., 142.72 us.

In other words, the time-frequency resource size of the reference signal resource shall be equal to the time-frequency resource size of the at least one first resource element and equal to the time-frequency resource size of the at least one second resource element, so that the reference signal resource for transmitting the reference signal is the same in the first cell as in the second cell, i.e., the resources can be aligned in the time-frequency domain.

It should be understood that the sum of the symbol length and the cyclic prefix length as used herein is referring to the symbol length and the cyclic prefix in the same numerology, and the ratio of the CP length to the symbol length of the numerology may be fixed for different numerologies. For example, the CP length in the numerology may be about 7% of the symbol length, and thus when the symbol length of the first numerology is 66.67 us, the CP length is 4.687 us, and the time domain resource size of the first resource element corresponding to the first numerology is 71.36 us; and when the symbol length of the second numerology is 33.33 us, the CP length is 2.344 us, and the time domain resource size of the second resource element corresponding to the second numerology is 35.68 us. Certainly, the ratio of the length of the CP to the symbol length in the numerology may also be determined for different numerologies according to the specific situation, as long as the requirement of the subframe length of 1 ms is satisfied.

It should also be understood that, while the above descriptions have been laid out based on an example where any one of the second cells is inflicting interference onto the first cell as shown in FIG. 1, the method of an embodiment of the present disclosure may be applied to reference signal transmission between more cells. For example, when there is a first cell, a second cell, and a third cell that are neighboring to each other, then in 430, the network device 10 will determine the time domain resource size of the resource element with the largest time domain resource size among the three resource elements corresponding to the three cells to be the time domain resource size of the reference signal resource, and determine the frequency domain resource size of the resource element with the largest frequency domain resource size among the three resource elements to be the frequency domain resource size of the reference signal resource. Thus, the network devices of the three cells can simultaneously transmit reference signals to the terminal device 20 on the reference signal resource, enabling the terminal device 20 to measure the current channel state according to these reference signals.

In order to receive the reference signal transmitted from the network device 10, the terminal device 20 also needs to determine a reference signal resource for receiving the reference signal.

440: the terminal device 20 determines a first resource element corresponding to a first cell.

The first resource element has a time-frequency resource that is of a size different from that of the at least one second resource element, where the at least one second resource element is resource element that corresponding respectively to at least one second numerology used by at least one of the second cells.

Again referring to FIG. 1 as an example, during a data interaction with the network device 10, the terminal device 20, which is located in the first cell, may use the first numerology to transmit data according to the parameters in the first numerology, such as subcarrier spacing, symbol length and CP length. Instead, the numerology used by the terminal device (not shown) located at the second cell for data transmission with the network device 30 may be the second numerology. The second numerology may be different from the first numerology. For example, the sum of a symbol length and a cyclic prefix length may be different, and/or the subcarrier spacing may be different. Thus, the first resource element of the first cell using the first numerology and the second resource element of the second cell using the second numerology may be different resource elements, and the time-frequency resource size is not equal for the first resource element and the second resource element. For example, as shown in FIG. 3, in a first numerology, the subcarrier spacing is 15 kHz, the symbol length is ⅟₁₅ kHz (i.e. 66.67 us), and the CP length is 4.687 us; and in a second numerology, the subcarrier spacing is 30 kHz, the symbol length is ⅟₃₀ kHz (i.e. 33.33 us), and the CP length is 2.344 us. Thus, for a first resource element of the cell using the first numerology (the shaded blocks in the left portion of FIG. 3), the frequency domain resource size is 15 kHz, and the time domain resource size is 71.36 us, while for a second resource element of the cell using the second numerology (the shaded blocks in the right portion of FIG. 3), the frequency domain resource size is 30 kHz, and the time domain resource size is 35.68 us.

In an embodiment, the first resource element determined by the terminal device 20 at 440 may be information about the time-frequency resource used by the network device 10 for transmitting the first resource element to the terminal device 20. Thus, the terminal device 20 may acquire the information about the time-frequency resource of the first resource element, and may in turn determine the reference signal resource according to the information about the time-frequency resource. Alternatively, the terminal device 20 may independently determine the first resource element according to the first numerology.

450: the terminal device 20 determines a reference signal resource according to the first resource element.

The time domain resource size of the reference signal resource is equal to the time domain resource size of the largest time domain resource among the first resource element and at least one second resource element, or equal to an even multiple of the time domain resource size of the resource element with the largest time domain resource. The frequency domain resource size of the reference signal resource is equal to the frequency domain resource size of the largest frequency domain resource among the first resource element and at least one second resource element, or equal to an even multiple of the frequency domain resource size of the resource element with the largest frequency domain resource, where the at least one second resource element is a resource element corresponding to at least one second cell.

Figure 6:
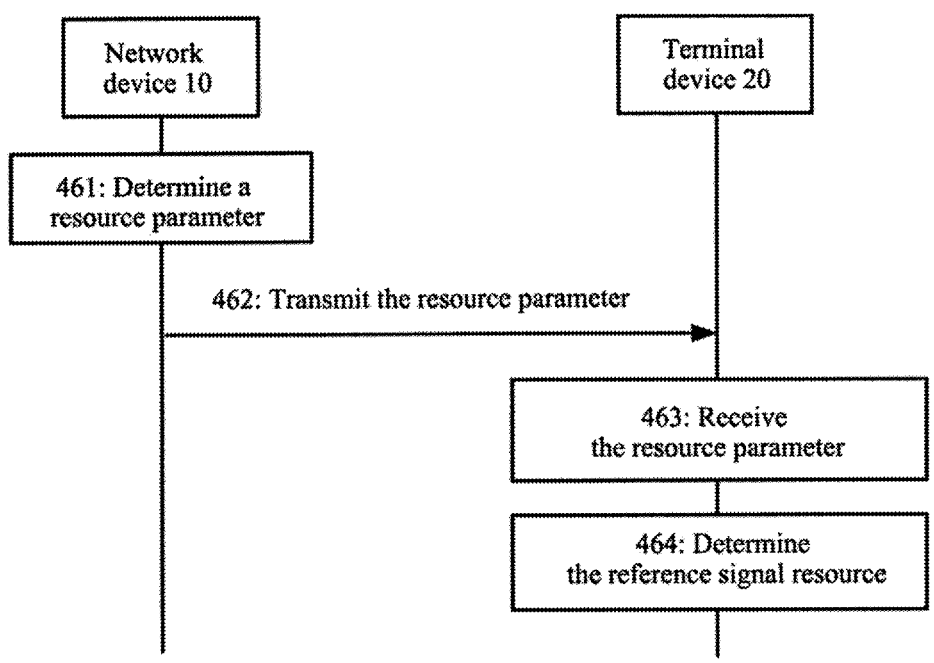
FIG. 6 is an interaction flow chart for determining a reference signal resource according to an embodiment of the present disclosure.
Figure 7:
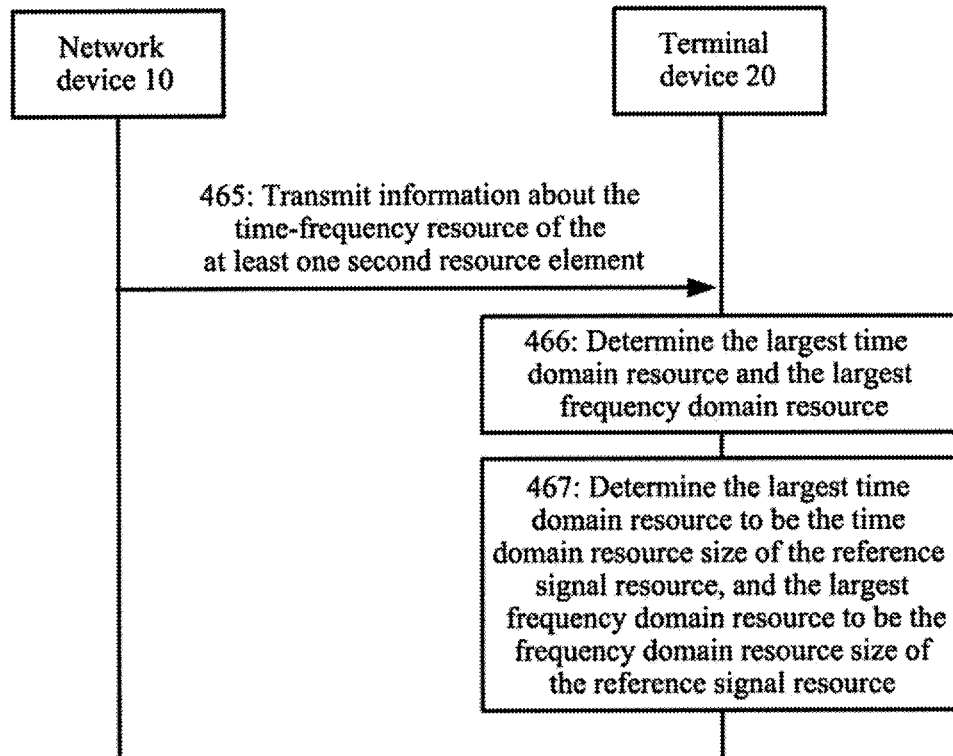
FIG. 7 is an interaction flow chart for determining a reference signal resource according to another embodiment of the present disclosure.

At 450, the terminal device 20 may determine the reference signal resource in accordance with any of the following two modes, which will now be specifically described in conjunction with FIGS. 6 and 7.

Mode 1

The network device 10 indicates to the terminal device 20 a resource parameter corresponding to the first resource element, so that the terminal device 20 may directly learn the reference signal resource according to the resource parameter. FIG. 6 is an interaction flow chart for determining a reference signal resource according to an embodiment of the present disclosure. Since the terminal device 20 determines the reference signal resource according to the first resource element, this means before 450, the method further includes 461 to 463.

461: the network device 10 determines a resource parameter corresponding to the first resource element.

The resource parameter includes: a first ratio of the time domain resource size of the reference signal resource to the time domain resource size of the first resource element, and a second ratio of the frequency domain resource size of the reference signal resource to the frequency domain resource size of the first resource element.

Alternatively, the resource parameter may include: a difference between the time domain resource size of the reference signal resource and that of the first resource element, and a difference between the frequency domain resource size of the reference signal resource and that of the first resource element.

Alternatively, the resource parameter may further include: other parameter capable of clearly indicating a relation between the time domain resource size of the reference signal resource and that of the first resource element, and a parameter capable of clearly indicating a relation between the frequency domain resource size of the reference signal resource and that of the first resource element.

462: the network device 10 transmits the resource parameter to the terminal device 20.

463: the terminal device 20 receives the resource parameter transmitted from the network device 10.

At this time, 450 may be replaced by 464.

464: the terminal device 20 determines the reference signal resource according to the first resource element and the resource parameter.

In an example where the resource parameter includes the first ratio and the second ratio, the terminal device 20 may determine a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

That is, the terminal device 20 multiplies the time domain resource size of the first resource element by the first ratio in the resource parameter to obtain a result that is used as the time domain resource size of the reference signal resource. The terminal device 20 multiplies the frequency domain resource size of the first resource element by the second ratio in the resource parameter to obtain a result that is used as the frequency domain resource size of the reference signal resource.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

Again referring to FIG. 5 as an example, for a first resource element, the frequency domain resource size is 15 kHz, the time domain resource size is 1/15 kHz (i.e. 66.67 us), and the CP length is 4.687 us; and for a second resource element, the frequency domain resource size is 30 kHz, the time domain resource size is 1/30 kHz (i.e. 33.33 us), and the CP length is 2.344 us. Assuming M is the first ratio of the time domain resource size of the reference signal resource to the time domain resource size of the first resource element, and N is the second ratio of the frequency domain resource size of the reference signal resource to the frequency domain resource size of the first resource element. Assuming that the network device 10 determines for the reference signal resource a frequency domain resource size of 30 kHz and a time domain resource size of 1/15 kHz (i.e. 71.36 us) at 430, then the resource parameter corresponding to the first resource element includes M=30 kHz/15 kHz=2 and N=71.36 us/71.36 us=1.

Thus, M=2 and N=1 are included in the resource parameter corresponding to the first resource element and transmitted from the network device 10 to the terminal device 20. After receiving the resource parameter transmitted from the network device 10, the terminal device 20 determines for the reference signal resource a frequency domain resource size of 15 kHz×2=30 kHz and a time domain resource size of 71.36 us×1=71.36 us according to the first resource element with the frequency domain resource size of 15 kHz, time domain resource size of 71.36 us, M=2 and N=1. It should be understood that the resource parameter corresponding to the first resource element and transmitted from the network device 10 to the terminal device 20 may also be M=4×n, N=2×m, etc., where both n and m are even numbers.

It can be seen from FIG. 5 that the first resource element and the second resource element have different time-frequency resources, hence they are also corresponding to different resource parameters. The resource parameter corresponding to the first resource element is M=2, N=1, and the resource parameter corresponding to the second resource element is M=1, N=2.

Mode 2

This is another mode for the terminal device 20 to determine the reference signal resource, that is, the terminal device 20 independently determines the reference signal resource according to the first resource element and the at least one second resource element. FIG. 7 is an interaction flow chart for determining a reference signal resource according to another embodiment of the present disclosure.

Before the terminal device 20 determines the reference signal resource according to the first resource element, the method further includes:

465: the terminal device 20 receives information about the time-frequency resource of the at least one second resource element from the network device 10.

At this time, 450 includes 465 and 466, that is, 460 can be replaced by 465 and 466.

466: the terminal device 20 determines a time domain resource size of the resource element with the largest time domain resource, and the frequency domain resource size of the resource element with the largest frequency domain resource among the first resource element and the at least one second resource element.

467: the terminal device 20 determines the time domain resource size of the resource element with the largest time domain resource to be the time domain resource size of the reference signal resource, and the frequency domain resource size of the resource element with the largest frequency domain resource to be the frequency domain resource size of the reference signal resource.

Specifically, the terminal device 20 may acquire information about the time-frequency resource of the first resource element, and information about the time-frequency resource of the at least one second resource element, and may determine the reference signal resource according to the information about the time-frequency resources. The information about the time-frequency resource of the first resource element may include time domain resource information and/or frequency domain resource information about the first resource element, and the information about the time-frequency resource of the at least one second resource element may include time domain resource information and/or frequency domain resource information about individual second resource elements of the at least one second resource element. The terminal device 20 may determine the reference signal resource according to the information about the time-frequency resource of the first resource element and the information about the time-frequency resource of the at least one second resource element.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

For example, the time domain resource size may be different for the first resource element and the second resource element. Having acquired the information about the time domain resource of the first resource element, the terminal device 20 may compare the time domain resource size with that of the second resource element, and determine the time domain resource size of the resource element with larger time domain resource to be the time domain resource size of the reference signal resource. Meanwhile, having acquired the information about the frequency domain resource of the first resource element, the terminal device 20 may compare the frequency domain resource size with that of the second resource element, and determine the frequency domain resource size of the resource element with larger frequency domain resource to be the frequency domain resource size of the reference signal resource. For example, as shown in FIG. 5, for a first resource element, the frequency domain resource size is 15 kHz, and the time domain resource size is 71.36 us, and for a second resource element, the frequency domain resource size is 30 kHz, and the time domain resource size is 35.68 us. Thus, for the reference signal resource, the terminal device 20 determines the frequency domain resource size to be 30 kHz, and the time domain resource size to be 71.36 us. Of course, the reference signal resource may also have a frequency domain resource size of n×30 kHz and a time domain resource size of m×71.36 us, where n and m are both even numbers, which will not be limited in an embodiment herein, as long as the reference signals are transmitted from different cells on reference signal resources that are aligned on time and frequency.

In Mode 2, the terminal device 20 may separately receive, from the network device of each second cell among the at least one second cell, time-frequency resource information about the resource element corresponding to each cell. Alternatively, the network device 10 of the first cell may learn about the time-frequency resource information about the resource elements of the other cells, and may transmit the time-frequency resource information about the first resource element and the at least one second resource element to the terminal device 20. Having received the time-frequency resource information about multiple resource elements, the terminal device 20 may select the time domain resource size of the resource element with the largest time domain resource as the time domain resource size of the reference signal resource, and the frequency domain resource size of the resource element with the largest frequency domain resource as the frequency domain resource size of the reference signal resource.

For example, when n cells are neighboring to each other, and are corresponding to n numerologies among which at least two are different, and the corresponding subcarrier spacing and the sum of a symbol length and a cyclic prefix length are (F1, T1), (F2, T2), . . . , (Fn, Tn), respectively. Thus, for the Mode 2 in 450, the frequency domain resource size and the time domain resource size of the reference signal resource as determined by the terminal device 20 fulfill the following equations: F(CSI-RS)=Max(F1 . . . Fn); T(CSI-RS)=Max(T1 . . . Tn), where F(CSI-RS) is the frequency domain width of the reference signal resource, and T(CSI-RS) is the time domain width of the reference signal resource. Max(x) represents the maximum of the listed parameters. With the above equations, the network device 10 only needs to broadcast a list of time-frequency resource information about different resource elements that need to be measured by the terminal device 20 at the cell edge, and the terminal device 20 can derive the time-frequency resource of the reference signal resource based on the above equations.

It should be understood that, in addition to the foregoing Mode 1 or Mode 2, the terminal device 20 may also determine the reference signal resource in accordance with other modes. The mode may be that the network device 10 transmits the resource information about the reference signal resource that has been determined by the network device 10 to the terminal device 20. Having received the resource information about the reference signal resource transmitted from the network device 10, the terminal device 20 may simply receive the reference signal transmitted from the network device 10 on the time-frequency resource indicated by the resource information.

It should also be understood that, before the terminal device 20 in an embodiment of the present disclosure determines the first resource element, the network device 10 may transmit information about the first numerology used by the first cell and the at least one second numerology used by the at least one second cell to the terminal device 20, so that the terminal device 20 may determine the first resource element according to the first numerology and the at least one second numerology.

Of course, the network device 10 may also broadcast to the terminal device 20 a list of different numerologies used by the cells. In turn, the terminal device 20 determines, among the multiple numerologies, the largest subcarrier spacing or an even multiple of the largest subcarrier spacing to be the frequency domain resource size of the reference signal resource, and determines the largest sum of the symbol length and cyclic prefix length or an even multiple of the largest sum of the symbol length and cyclic prefix length to be the time domain resource size of the reference signal resource.

460: the network device 10 transmits a reference signal to a terminal device 20 on the reference signal resource.

Having determined the reference signal resource, the network device transmits the reference signal to the terminal device 20 on the reference signal resource. Meanwhile, network devices of other cells, for example, the network device 30 of the second cell, may also transmit a reference signal to the terminal device 20. For a cell supporting CoMP, the second cell may be neighboring to the first cell, and the terminal device 20 may receive the reference signals transmitted from both the network device 10 and the network device 30 at the same time. Thus, the terminal device 20 will use the reference signal to measure the reference signals and interference intensity from each cell. For example, as shown in FIG. 5, the terminal device 20 at the edge of the first cell can measure the channel state under the interference from the second cell.

Having determined the reference signal resource according to the two modes at 460, the terminal device 20 executes 470.

470: the terminal device 20 receives the reference signal transmitted from the network device 10 on the reference signal resource.

Meanwhile, network devices of other cells, for example, the network device 30 of the second cell as shown in FIG. 1, may also transmit a reference signal to the terminal device 20. The terminal device 20 may now receive the reference signals transmitted from both the network device 10 and the network device 30 at the same time. Thus, the terminal device 20 will use these two reference signals to measure the channel state. For example, as shown in FIG. 5, the terminal device 20 at the edge of the first cell can measure the channel state under the interference from the second cell.

The reference signal in an embodiment of the present disclosure may include a zero-power reference signal or a non-zero-power reference signal.

When the reference signal received by the terminal device 20 from the network device 10 is a non-zero-power reference signal, and the reference signal received by the terminal device 20 from the network device 30 is also a non-zero-power reference signal, the terminal device 20 in the first cell can measure the channel state with the interference from the second cell. When the reference signal received by the terminal device 20 from the network device 10 is a non-zero-power reference signal, yet the reference signal received by the terminal device 20 from the network device 30 is a zero-power reference signal, the terminal device 20 in the first cell can measure the channel state without the interference from the second cell.

In accordance to the method based on an embodiment of the present disclosure, reference signal resources for transmitting reference signals are determined according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

It should be understood that an embodiment of the present disclosure is described by way of example using reference signal transmission between the network device 10 and the terminal device 20. Only one second cell is illustrated to represent the cells that may inflict interference upon the terminal device 20 of the first cell. However, the method for transmitting a reference signal according to an embodiment of the present disclosure may be applied to more cells. Network devices and terminal devices in each cell can equally determine the reference signal resource and transmit the reference signal on the reference signal transmission resource according to the method described in embodiment of the present disclosure.

Moreover, when the reference signal transmitted from a network device in a neighboring cell of the first cell to a terminal device 20 is a non-zero-power reference signal, the terminal device 20 may measure the channel state under the interference of that cell. When the reference signal transmitted from a network device in that cell to a terminal device 20 is a zero-power reference signal, the terminal device 20 may measure the channel state without the interference from that cell.

The terminal device 20 can also measure the channel state under the collective interference from the multiple cells by receiving multiple non-zero-power reference signals.

In an embodiment, the method further includes: determining, by the network device 10, configuration information including a distribution period of the reference signal resource in time domain and a distribution period of the reference signal resource in frequency domain; and transmitting, by the network device 10, the configuration information to the terminal device 20.

Now, the terminal device 20 receives a reference signal transmitted on the reference signal resource from the network device 10, including: the terminal device 20 receives the reference signal transmitted from the network device 10 on a plurality of the reference signal resources distributed periodically.

It should be understood that the distribution period of the reference signal resource in the time domain may also be referred to as the density of the reference signal in the time domain, and the distribution period of the reference signal resource in the frequency domain may also be referred to as the density of the reference signal in the frequency domain. For example, the reference signal resources shown in FIGS. 2(*a*), 2(*b*) and (3) are distributed in the frequency domain according to a certain period which equals to the frequency domain resource size of four resource elements. That is, a reference signal is transmitted once after every three resource elements in the frequency domain. It is also possible to specify that the reference signal be transmitted on certain fixed subframes.

It should be understood that the reference signal in an embodiment of the present disclosure may be used for the transmission of a downlink reference signal, such as a channel state information reference signal (CSI-RS), a cell-specific reference signal (CRS), and a demodulation reference signal (DMRS), and may also be used for an uplink reference signal, such as a sounding reference signal (SRS), an uplink DMRS, and the like.

Moreover, the interference among the multiple cells in an embodiment of the present disclosure further includes interference among different numerologies. In accordance with the method for transmitting a reference signal described in an embodiment of the present disclosure, assistance may also be lent to the receiving end in estimating interferences among different numerologies.

It should be understood that, in various embodiments of the present disclosure, the actual numerical value of the serial numbers identifying the foregoing processes does not in any way indicate or imply the order in which the processes should be executed. Rather, the order of executing the processes shall be determined by their functions and internal logics. The numerical values shall not be construed as any limitation on the specific procedure for implementing the embodiments of the present disclosure.

The method for transmitting data according to an embodiment of the present disclosure has been detailed above, and now a network device and a terminal device according to an embodiment of the present disclosure will be described hereinunder. It should be understood that the network device and the terminal device in the embodiments of the present disclosure may perform various methods in the aforementioned embodiments of the present disclosure. That is, for the specific processes of operating the various devices hereinunder, reference may be directed to their corresponding processes in the foregoing method embodiments.

Figure 8:
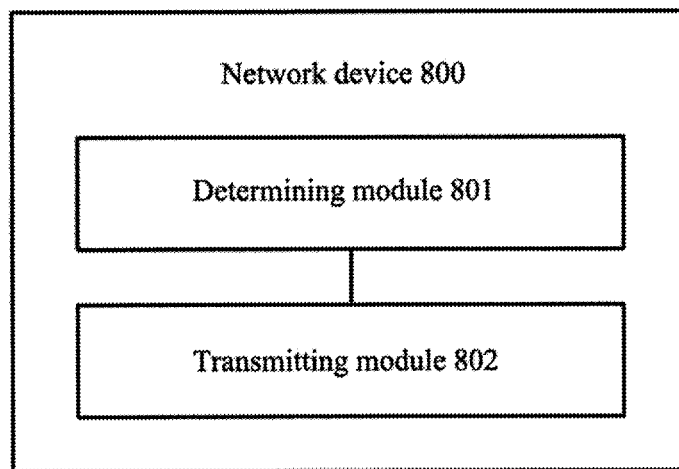
FIG. 8 is a structural block diagram illustrating a network device according to an embodiment of the present disclosure.

FIG. 8 shows a schematic block diagram of a network device 800 according to an embodiment of the present disclosure. As shown in FIG. 8, the network device 800 includes a determining module 801 and a transmitting module 802. The determining module 801 is configured to:

determine a first resource element corresponding to the first cell, and at least one second resource element corresponding to at least one second cell, where the first resource element has a time-frequency resource size different from that of the at least one second resource element;

determine a resource element with the largest time domain resource and a resource element with the largest frequency domain resource among the first resource element and the at least one second resource element;

determine a reference signal resource according to the resource element with the largest time domain resource and the resource element with the largest frequency domain resource; and the transmitting module 802 is configured to transmit a reference signal to a terminal device on the reference signal resource.

Thus, the network device determines reference signal resources for transmitting reference signals according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

In an embodiment, the determining module 801 is specifically configured to: determine the time domain resource size of the resource element with the largest time domain resource to be the time domain resource size of the reference signal resource, and the frequency domain resource size of the resource element with the largest frequency domain resource to be the frequency domain resource size of the reference signal resource.

In an embodiment, the determining module 801 is further specifically configured to: determine a resource parameter corresponding to the first resource element, the resource parameter including: a ratio of the time domain resource size of the reference signal resource to the time domain resource size of the first resource element, and a ratio of the frequency domain resource size of the reference signal resource to the frequency domain resource size of the first resource element; and the transmitting module 802 is configured to transmit the resource parameter to the terminal device.

In an embodiment, the transmitting module 802 is further specifically configured to: transmit information about the time-frequency resource of the first resource element, and/or information about the time-frequency resource of the at least one second resource element, to the terminal device.

In an embodiment, the determining module 801 is further specifically configured to: determine configuration information including a distribution period of the reference signal resource in time domain and a distribution period of the reference signal resource in frequency domain; and the transmitting module 802 is further configured to transmit the configuration information to the terminal device.

In an embodiment, the reference signal includes at least one of the following: a cell-specific reference signal (CRS), a channel state information reference signal (CSI-RS), and a demodulation reference signal (DMRS).

In an embodiment, the reference signal includes a zero-power reference signal or a non-zero-power reference signal.

In an embodiment, the network device is applied to coordinated multiple points (CoMP), and the second cell is neighboring to the first cell.

Figure 9:
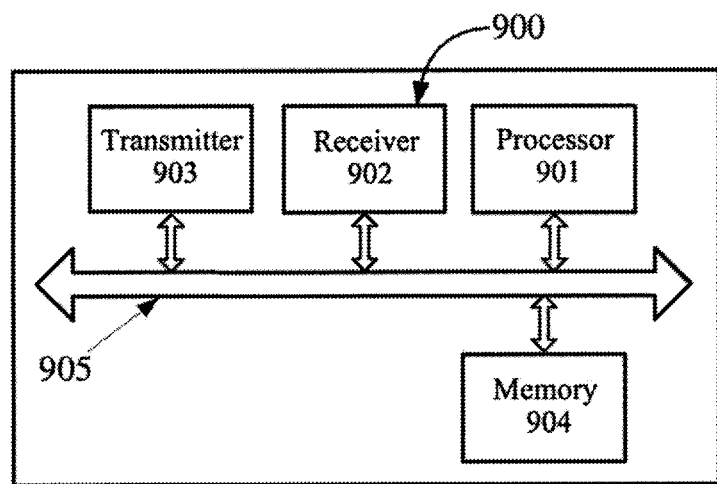
FIG. 9 is a structural block diagram illustrating a network device according to an embodiment of the present disclosure.

It should be noted that, in an embodiment of the present disclosure, the determining module 801 can be implemented by a processor, and the transmitting module 802 can be implemented by a transceiver. As shown in FIG. 9, the network device 900 may include a processor 901, a transceiver, and a memory 904. The transceiver may include a receiver 902 and a transmitter 903. The memory 904 can be configured to store information related to, e.g., basic parameters and filtering modes, and may also be configured to store codes and the like to be executed by the processor 901. Various components in the network device 900 are coupled together via a bus system 905 which may, in addition to a data bus, further include a power bus, a control bus, a status signal bus and the like.

The processor 901 is configured to:

determine a first resource element corresponding to the first cell, and at least one second resource element corresponding to at least one second cell, where the first resource element has a time-frequency resource size different from that of the at least one second resource element;

determine a resource element with the largest time domain resource and a resource element with the largest frequency domain resource among the first resource element and the at least one second resource element;

determine a reference signal resource according to the resource element with the largest time domain resource and the resource element with the largest frequency domain resource; and The transmitter 903 is configured to transmit a reference signal to a terminal device on the reference signal resource.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

In an embodiment, the processor 901 is particularly configured to: determine the time domain resource size of the resource element with the largest time domain resource to be the time domain resource size of the reference signal resource, and the frequency domain resource size of the resource element with the largest frequency domain resource to be the frequency domain resource size of the reference signal resource.

In an embodiment, the processor 901 is further configured to: determine a resource parameter corresponding to the first resource element, the resource parameter including: a ratio of the time domain resource size of the reference signal resource to the time domain resource size of the first resource element, and a ratio of the frequency domain resource size of the reference signal resource to the frequency domain resource size of the first resource element; and the transmitter 903 is configured to transmit the resource parameter to the terminal device.

In an embodiment, the transmitter 903 is further configured to: transmit information about the time-frequency resource of the first resource element, and/or information about the time-frequency resource of the at least one second resource element, to the terminal device.

In an embodiment, the processor 901 is further configured to: determine configuration information including a distribution period of the reference signal resource in time domain and a distribution period of the reference signal resource in frequency domain; and the transmitter 903 is further configured to transmit the configuration information to the terminal device.

In an embodiment, the reference signal includes at least one of the following: a cell-specific reference signal (CRS), a channel state information reference signal (CSI-RS), and a demodulation reference signal (DMRS).

In an embodiment, the reference signal includes a zero-power reference signal or a non-zero-power reference signal.

In an embodiment, the network device is applied to coordinated multiple points (CoMP), and the second cell is neighboring to the first cell.

Figure 10:
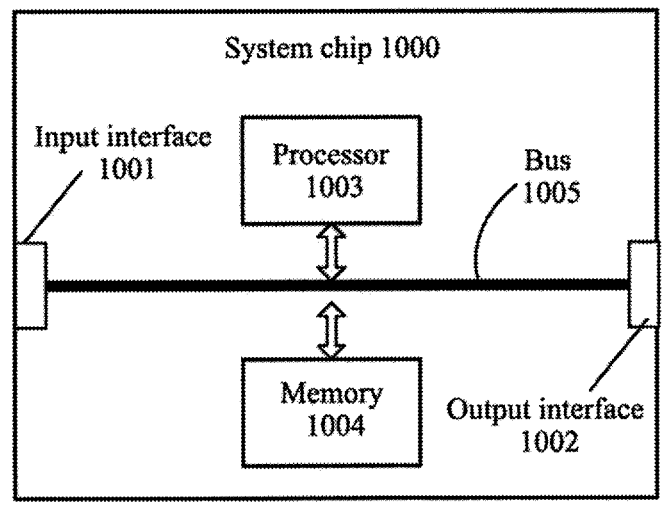
FIG. 10 is a schematic structural diagram illustrating a system chip according to an embodiment of the present disclosure.

FIG. 10 is a schematic structural diagram illustrating a system chip according to an embodiment of the present disclosure. The system chip 1000 in FIG. 10 includes an input interface 1001, an output interface 1002, at least one processor 1003, and a memory 1004, all of which are inter-connected via a bus 1005. The processor 1003 is configured to execute codes stored in the memory 1004, and when the codes are executed, the processor 1003 implements the methods performed by the network device 10 in FIGS. 4-7.

The network device 800 shown in FIG. 8 or the network device 900 shown in FIG. 9 or the system chip 1000 shown in FIG. 10 may implement the various processes implemented by the network devices 10 in the aforementioned method embodiments of FIGS. 4-7, which will not be repeated herein to avoid redundancy.

Figure 11:
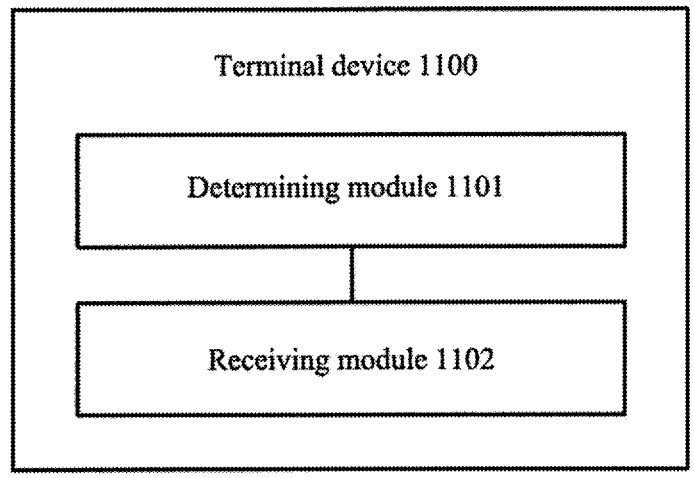
FIG. 11 is a structural block diagram illustrating a terminal device according to an embodiment of the present disclosure.

FIG. 11 shows a schematic block diagram of a terminal device 1100 according to an embodiment of the present disclosure. As shown in FIG. 11, the terminal device 1100 includes a determining module 1101 and a receiving module 1102. The determining module 1101 is configured to:

determine a first resource element corresponding to a first cell;

determine a reference signal resource according to the first resource element, where a time domain resource size of the reference signal resource is equal to the time domain resource size of the largest time domain resource among the first resource element and at least one second resource element, or equal to an even multiple of the time domain resource size of the resource element with the largest time domain resource; a frequency domain resource size of the reference signal resource is equal to the frequency domain resource size of the largest frequency domain resource among the first resource element and at least one second resource element, or equal to an even multiple of the frequency domain resource size of the resource element with the largest frequency domain resource, where the at least one second resource element is a resource element corresponding to at least one second cell; and the receiving module 1102 is configured to receive a reference signal transmitted on the reference signal resource from a network device in the first cell.

Thus, the terminal device determines reference signal resources for transmitting reference signals according to different resource elements of different cells based on different numerologies used by the different cells. This enables reference signal resources used by different cells in transmitting reference signals that are aligned in time domain and frequency domain, respectively, thereby solving the problem of reference signal transmission based on different numerologies.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

In an embodiment, before the determining module 1101 determines the reference signal resource according to the first resource element, the receiving module 1102 is further configured to:

receive a resource parameter corresponding to the first resource element from the network device, the resource parameter including: a first ratio of the time domain resource size of the reference signal resource to the time domain resource size of the first resource element, and a second ratio of the frequency domain resource size of the reference signal resource to the frequency domain resource size of the first resource element; and the determining module 1101 is specifically configured to: determine a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

In an embodiment, before the determining module 1101 determines the first resource element corresponding to the first cell, the receiving module 1102 is further configured to: receive information about the time-frequency resource of the at least one second resource element from the network device, where the determining module 1101 is specifically configured to: determine a time domain resource size of the resource element with the largest time domain resource, and the frequency domain resource size of the resource element with the largest frequency domain resource among the first resource element and the at least one second resource element; and determine the time domain resource size of the resource element with the largest time domain resource to be the time domain resource size of the reference signal resource, and the frequency domain resource size of the resource element with the largest frequency domain resource to be the frequency domain resource size of the reference signal resource.

In an embodiment, the receiving module 1102 is further configured to: receive, from the network device, configuration information including a distribution period of the reference signal resource in time domain and a distribution period of the reference signal resource in frequency domain; and receive the reference signal transmitted from the network device on a plurality of the reference signal resources distributed periodically.

In an embodiment, the reference signal includes at least one of the following: a cell-specific reference signal (CRS), a channel state information reference signal (CSI-RS), and a demodulation reference signal (DMRS).

In an embodiment, the reference signal includes a zero-power reference signal or a non-zero-power reference signal.

In an embodiment, the terminal device is applied to coordinated multiple points (CoMP), and the second cell is neighboring to the first cell.

Figure 12:
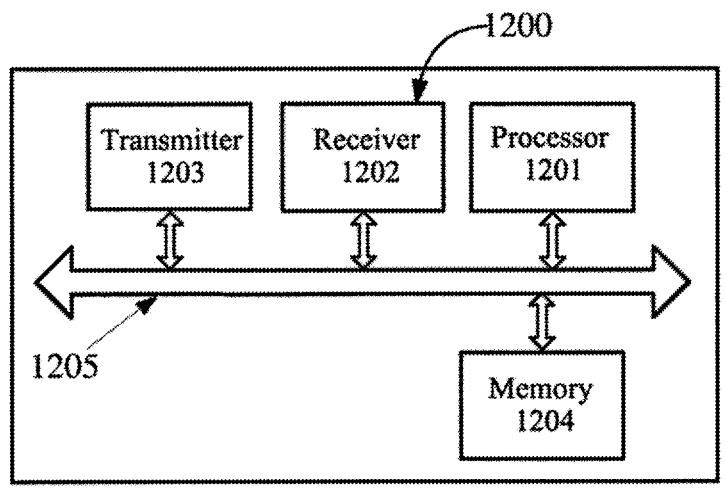
FIG. 12 is a structural block diagram illustrating a terminal device according to an embodiment of the present disclosure.

It should be noted that, in an embodiment of the present disclosure, the determining module 1101 can be implemented by a processor, and the transmitting module 1102 can be implemented by a transceiver. As shown in FIG. 12, the terminal device 1200 may include a processor 1201, a transceiver, and a memory 1204. The transceiver may include a receiver 1202 and a transmitter 1203. The memory 1204 can be configured to store information related to, e.g., numerology, guard band and filtering modes, and may also be configured to store codes and the like to be executed by the processor 1201. Various components in the network device 1200 are coupled together via a bus system 1205 which may, in addition to a data bus, further include a power bus, a control bus, a status signal bus and the like.

The processor 1201 is specifically configured to: determine a first resource element corresponding to the first cell; and determine the reference signal resource according to the first resource element, where: a time domain resource size of the reference signal resource is equal to the time domain resource size of the largest time domain resource among the first resource element and at least one second resource element, or equal to an even multiple of the time domain resource size of the resource element with the largest time domain resource; a frequency domain resource size of the reference signal resource is equal to the frequency domain resource size of the largest frequency domain resource among the first resource element and at least one second resource element, or equal to an even multiple of the frequency domain resource size of the resource element with the largest frequency domain resource, where the at least one second resource element is a resource element corresponding to at least one second cell; and The receiver 1202 is configured to receive a reference signal transmitted on the reference signal resource from a network device in the first cell.

In an embodiment, the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

In an embodiment, before the processor 1201 determines the reference signal resource according to the first resource element, the receiver 1202 is further configured to:

receive a resource parameter corresponding to the first resource element from the network device, the resource parameter including: a first ratio of the time domain resource size of the reference signal resource to the time domain resource size of the first resource element, and a second ratio of the frequency domain resource size of the reference signal resource to the frequency domain resource size of the first resource element; and the processor 1201 is specifically configured to: determine a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

In an embodiment, before the processor 1201 determines the first resource element corresponding to the first cell, the receiver 1202 is further configured to: receive information about the time-frequency resource of the at least one second resource element from the network device, where the processor 1201 is specifically configured to: determine a time domain resource size of the resource element with the largest time domain resource, and the frequency domain resource size of the resource element with the largest frequency domain resource among the first resource element and the at least one second resource element; and determine the time domain resource size of the resource element with the largest time domain resource to be the time domain resource size of the reference signal resource, and the frequency domain resource size of the resource element with the largest frequency domain resource to be the frequency domain resource size of the reference signal resource.

In an embodiment, the receiver 1202 is further configured to: receive, from the network device, configuration information including a distribution period of the reference signal resource in time domain and a distribution period of the reference signal resource in frequency domain; and receive the reference signal transmitted from the network device on a plurality of the reference signal resources distributed periodically.

In an embodiment, the reference signal includes at least one of the following: a cell-specific reference signal (CRS), a channel state information reference signal (CSI-RS), and a demodulation reference signal (DMRS).

In an embodiment, the reference signal includes a zero-power reference signal or a non-zero-power reference signal.

In an embodiment, the terminal device is applied to coordinated multiple points (CoMP), and the second cell is neighboring to the first cell.

Figure 13:
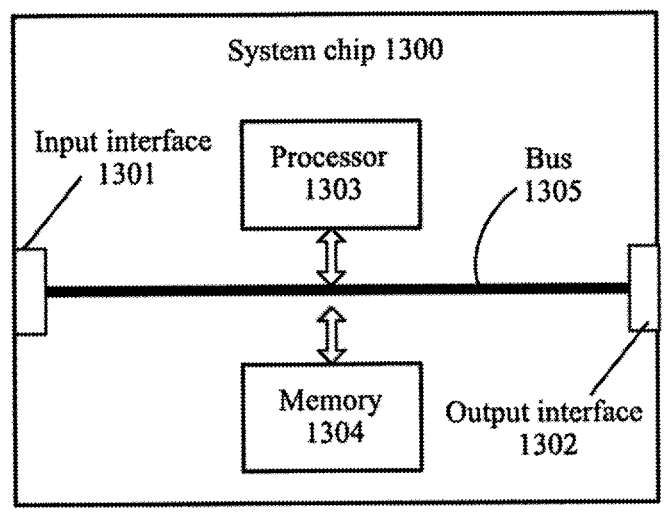
FIG. 13 is a schematic structural diagram illustrating a system chip according to an embodiment of the present disclosure.

FIG. 13 is a schematic structural diagram illustrating a system chip according to an embodiment of the present disclosure. The system chip 1300 in FIG. 13 includes an input interface 1301, an output interface 1302, at least one processor 1303, and a memory 1304, all of which are inter-connected via a bus 1305. The processor 1303 is configured to execute codes stored in the memory 1304, and when the codes are executed, the processor 1303 implements the methods performed by the terminal device 20 in FIGS. 4-7.

The terminal device 1100 shown in FIG. 11 or the terminal device 1200 shown in FIG. 12 or the system chip 1300 shown in FIG. 13 may implement the various processes implemented by the terminal devices 20 in the aforementioned method embodiments of FIGS. 4-7, which will not be repeated herein to avoid redundancy.

It can be understood that the processor in an embodiment of the present disclosure may be an integrated circuit chip with signal processing capability. During implementation, each step of the aforementioned method embodiments may be accomplished by an integrated logic circuit of hardware in a processor or instructions in the form of software. The above processor may be a general-purpose processor, a digital signal processor (DSP), an application specific integrated circuit (ASIC), or a field programmable gate array (FPGA) or other programmable logic devices, a discrete gate or a transistor logic device, or a discrete hardware component. These can implement or execute various methods, steps, and logical block diagrams disclosed in the embodiments of the present disclosure. The general purpose processor may be a microprocessor, or the processor may also be any conventional processor or the like. The steps of the methods disclosed in the embodiments of the present disclosure may be directly implemented as operations on a hardware decoding processor, or may be executed by a combination of hardware and software modules in the decoding processor. The software module may be located in a conventional storage medium such as a random access memory, a flash memory, a read only memory, a programmable read only memory or an electrically erasable programmable memory, a register, and the like. The storage medium is located in the memory, and the processor reads the information in the memory and combines the hardware to complete the steps of the above methods.

It is to be understood that the memory in the embodiments of the present disclosure may be a volatile memory or a non-volatile memory, or both. The non-volatile memory may be a read-only memory (ROM), a programmable ROM (PROM), or an erasable programmable ROM (EPROM), electrically erasable programmable ROM (EEPROM) or a flash memory. The volatile memory may be a random access memory (RAM), which is used as an external cache. By way of example rather than limitation, many forms of RAM may be used, such as static RAM (SRAM), dynamic RAM (DRAM), synchronous dynamic random access memory (SDRAM), double data rate SDRAM (DDR SDRAM), enhanced SDRAM (ESDRAM), synchlink DRAM (SL-DRAM) and direct rambus RAM (DR RAM). It should be noted that the memories of the systems and methods described herein are intended to include, but not limited to, these and any other suitable types of memory.

Additionally, the terms "system" and "network" are used interchangeably herein. The terms "and/or" as used herein is merely an associative relation describing associated objects, indicating the possibility of three associative relations. For example, "A and/or B" may indicate three possibilities: only A is presented, both A and B are presented, only B is presented. In addition, the character "/" as used herein generally indicates that the objects behind and after it are associated by an "or" relation.

It should be understood that, in embodiments of the present disclosure, "B associated with A" means that B is related to, and can be determined from, A. However, it should also be understood that determining B from A does not mean that B is determined solely from A. Rather, B can also be determined from A and/or other information.

Those of ordinary skill in the art will appreciate that the elements and algorithm steps of the various examples described in connection with the embodiments disclosed herein can be implemented as electronic hardware or a combination of computer software and electronic hardware. Whether these functions are performed in hardware or software depends on the specific application and design constraints of the solution. A person of ordinary skill in the art may target at individual applications with different approaches for implementing the functions described hereinabove, but such implementations shall not be considered to be beyond the scope of the present disclosure.

It will be apparent to those of ordinary skill in the art that, for the convenience and conciseness of the descriptions, the particular operation process of the aforementioned system, device and unit can be understood by referring to corresponding processes in the foregoing method embodiments, which will not be repeated herein.

In the several embodiments provided by the present disclosure, it should be understood that the disclosed system, device and method may be implemented in other manners. For example, the device embodiments described above are merely illustrative, e.g. the units are categorized according to logical functions only, and other categories can be used in actual implementations. For instance, multiple units or components may be combined or integrated into another system, or some features can be omitted or skipped. Moreover, an illustrated or discussed coupling or direct coupling or communication connection may be an indirect coupling or communicative connection an interface, device or unit, and may be in electrical, mechanical, or other forms.

The units described as separate members may be or may not be physically separated. The members shown as units may be or may not be physical units, and may be located at the same place or may be distributed in multiple network units. Some or all of the elements may be selected according to the actual needs for realizing the objectives of the solutions of the embodiments.

In addition, various functional units in various embodiments of the present disclosure may be integrated into a single processing unit, or each unit may be presented in physically separated forms, or two or more units may be integrated into a single unit.

The functions may, if implemented in the form of a software functional unit and marketed or used as a standalone product, be stored in a computer-readable storage medium. Based on these understandings, the essence of the technical solution of this disclosure, or the part thereof contributing to the prior art, or all or part of the technical solution may be embodied in the form of a software product. The computer software product may be stored in a storage medium, and may include a number of instructions that can cause a computer device, which may be a personal computer, server, network device or the like, to carry out all or part of the steps in various embodiments of this disclosure. The storage medium described above may include a USB disk, a mobile hard disk, a read-only memory (ROM), a random access memory (RAM), a magnetic disk, an optical disk, and the like, each of which can store program code.

What is described above are merely some of the specific implementations of, rather than limitation on the protection scope of, the present disclosure. Any and all variation and/or substitution readily conceivable by those of ordinary skill in the art within the technical scope disclosed in the present disclosure shall fall within the protection scope of the present disclosure. Therefore, the protection scope of the present disclosure shall be subject to the appended claims.

The invention claimed is:

1. A method for transmitting a reference signal, comprising:
    determining, by a network device of a first cell, a first resource element corresponding to the first cell, and at least one second resource element corresponding to at least one second cell, wherein the first resource element has a time-frequency resource size different from that of the at least one second resource element;
    determining, by the network device, a resource element with a largest time domain resource and a resource element with a largest frequency domain resource among the first resource element and the at least one second resource element;
    determining, by the network device, a reference signal resource according to the resource element with the largest time domain resource and the resource element with the largest frequency domain resource; and
    transmitting, by the network device, a reference signal to a terminal device on the reference signal resource;
    wherein the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and
    the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

2. The method according to claim 1, wherein the determining, by the network device, a reference signal resource according to the resource element with a largest time domain resource and the resource element with a largest frequency domain resource comprises:
  determining, by the network device, the time domain resource size of the resource element with the largest time domain resource to be the time domain resource size of the reference signal resource, and the frequency domain resource size of the resource element with the largest frequency domain resource to be the frequency domain resource size of the reference signal resource.

3. The method according to claim 1, further comprising:
  determining, by the network device, a resource parameter corresponding to the first resource element, the resource parameter comprising: a ratio of the time domain resource size of the reference signal resource to the time domain resource size of the first resource element, and a ratio of the frequency domain resource size of the reference signal resource to the frequency domain resource size of the first resource element; and
  transmitting, by the network device, the resource parameter to the terminal device.

4. A method for transmitting a reference signal, comprising:
  determining, by a terminal device, a first resource element corresponding to a first cell;
  determining, by the terminal device, a reference signal resource according to the first resource element, wherein a time domain resource size of the reference signal resource is equal to the time domain resource size of a largest time domain resource among the first resource element and at least one second resource element, or equal to an even multiple of the time domain resource size of the resource element with the largest time domain resource; a frequency domain resource size of the reference signal resource is equal to the frequency domain resource size of a largest frequency domain resource among the first resource element and at least one second resource element, or equal to an even multiple of the frequency domain resource size of the resource element with the largest frequency domain resource, wherein the at least one second resource element is a resource element corresponding to at least one second cell; and
  receiving, by the terminal device, a reference signal transmitted on the reference signal resource from a network device in the first cell;
  wherein the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and
  the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

5. The method according to claim 4, wherein before the determining, by the terminal device, a reference signal resource according to the first resource element, the method further comprises:
  receiving, by the terminal device, a resource parameter corresponding to the first resource element from the network device, the resource parameter comprising:
  a first ratio of the time domain resource size of the reference signal resource to the time domain resource size of the first resource element, and a second ratio of the frequency domain resource size of the reference signal resource to the frequency domain resource size of the first resource element; and
  the determining, by the terminal device, a reference signal resource according to the first resource element comprises:
  determining, by the terminal device, a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

6. The method according to claim 4, wherein before the determining, by a terminal device, a first resource element corresponding to a first cell, the method further comprises:
  receiving, by the terminal device, information about the time-frequency resource of the at least one second resource element from the network device,
  wherein the determining, by the terminal device, a reference signal resource according to the first resource element comprises:
  determining, by the terminal device, a time domain resource size of the resource element with the largest time domain resource, and the frequency domain resource size of the resource element with the largest frequency domain resource among the first resource element and the at least one second resource element; and
  determining, by the terminal device, the time domain resource size of the resource element with the largest time domain resource to be the time domain resource size of the reference signal resource, and the frequency domain resource size of the resource element with the largest frequency domain resource to be the frequency domain resource size of the reference signal resource.

7. The method according to claim 4, further comprising:
  receiving, by the terminal device and from the network device, configuration information comprising a distribution period of the reference signal resource in time domain and a distribution period of the reference signal resource in frequency domain; and
  receiving, by the terminal device, a reference signal transmitted on the reference signal resource from the network device, comprising:
  receiving, by the terminal device, the reference signal transmitted from the network device on a plurality of the reference signal resources distributed periodically.

8. The method according to claim 4, wherein the reference signal comprises at least one of:
  a cell-specific reference signal (CRS), a channel state information reference signal (CSI-RS), and a demodulation reference signal (DMRS).

9. The method according to claim 4, wherein the reference signal comprises a zero-power reference signal or a non-zero-power reference signal.

10. The method according to claim 4, wherein the method is applied to coordinated multiple points (CoMP), and the second cell is neighboring to the first cell.

11. A terminal device, comprises a processor, a receiver and a memory storing instructions thereon, the processor when executing the instructions, being configured to:
determine a first resource element corresponding to a first cell;
determine a reference signal resource according to the first resource element, wherein a time domain resource size of the reference signal resource is equal to the time domain resource size of a largest time domain resource among the first resource element and at least one second resource element, or equal to an even multiple of the time domain resource size of the resource element with the largest time domain resource; a frequency domain resource size of the reference signal resource is equal to the frequency domain resource size of a largest frequency domain resource among the first resource element and at least one second resource element, or equal to an even multiple of the frequency domain resource size of the resource element with the largest frequency domain resource, wherein the at least one second resource element is a resource element corresponding to at least one second cell; and
the receiver is configured to receive a reference signal transmitted on the reference signal resource from a network device in the first cell;
wherein the time domain resource size of the first resource element is equal to a sum of a symbol length and a cyclic prefix length in a numerology used by the first cell, and/or the frequency domain resource size of the first resource element is equal to a subcarrier spacing in the numerology used by the first cell; and
the time domain resource size of each of the at least one second resource element is equal to a sum of a symbol length and a cyclic prefix length in a numerology used by a cell corresponding to the each of the at least one second resource element, and/or the frequency domain resource size of each of the at least one second resource element is equal to a subcarrier spacing in the numerology used by the cell corresponding to the each of the at least one second resource element.

12. The terminal device according to claim 11, wherein before the processor determines a reference signal resource according to the first resource element, the receiver is further configured to:
receive a resource parameter corresponding to the first resource element from the network device, the resource parameter comprising:
a first ratio of the time domain resource size of the reference signal resource to the time domain resource size of the first resource element, and a second ratio of the frequency domain resource size of the reference signal resource to the frequency domain resource size of the first resource element; and the processor is specifically configured to: determine a product of the time domain resource size of the first resource element multiplying the first ratio to be the time domain resource size of the reference signal resource, and a product of the frequency domain resource size of the first resource element multiplying the second ratio to be the frequency domain resource size of the reference signal resource.

13. The terminal device according to claim 11, wherein before the processor determines a first resource element corresponding to the first cell, the receiver is further configured to:
receive information about the time-frequency resource of the at least one second resource element from the network device,
wherein the processor is specifically configured to:
determine a time domain resource size of the resource element with the largest time domain resource, and the frequency domain resource size of the resource element with the largest frequency domain resource among the first resource element and the at least one second resource element; and
determine the time domain resource size of the resource element with the largest time domain resource to be the time domain resource size of the reference signal resource, and the frequency domain resource size of the resource element with the largest frequency domain resource to be the frequency domain resource size of the reference signal resource.

14. The terminal device according to claim 11, wherein the receiver is further configured to:
receive, from the network device, configuration information comprising a distribution period of the reference signal resource in time domain and a distribution period of the reference signal resource in frequency domain; and
receive the reference signal transmitted from the network device on a plurality of the reference signal resources distributed periodically.

15. The terminal device according to claim 11, wherein the reference signal comprises at least one of:
a cell-specific reference signal (CRS), a channel state information reference signal (CSI-RS), and a demodulation reference signal (DMRS).

16. The terminal device according to claim 11, wherein the reference signal comprises a zero-power reference signal or a non-zero-power reference signal.

17. The terminal device according to claim 11, wherein the terminal device is applied in coordinated multiple points (CoMP), and the second cell is neighboring to the first cell.

* * * * *